United States Patent
Schindele

(10) Patent No.: US 8,734,892 B2
(45) Date of Patent: May 27, 2014

(54) SURFACE OF THE WORKPIECE AND A RELATIVE MOTION BETWEEN THE WORKPIECE AND THE COATING ELEMENT

(75) Inventor: Paul Schindele, Kempten (DE)

(73) Assignee: Hochschule fuer angewandte Wissenschaften-Fachhochschule Kempten, Kempten (DE)

( * ) Notice: Subject to any disclaimer, the term of this patent is extended or adjusted under 35 U.S.C. 154(b) by 325 days.

(21) Appl. No.: 13/060,522

(22) PCT Filed: Aug. 19, 2009

(86) PCT No.: PCT/EP2009/006008
§ 371 (c)(1),
(2), (4) Date: Feb. 24, 2011

(87) PCT Pub. No.: WO2010/022883
PCT Pub. Date: Mar. 4, 2010

(65) Prior Publication Data
US 2011/0151109 A1    Jun. 23, 2011

(30) Foreign Application Priority Data

Aug. 28, 2008  (DE) .......................... 10 2008 044 763

(51) Int. Cl.
*C23C 26/00*   (2006.01)

(52) U.S. Cl.
USPC .......................................................... 427/11

(58) Field of Classification Search
USPC .......................................................... 427/11
See application file for complete search history.

(56) References Cited

U.S. PATENT DOCUMENTS

| | | | | |
|---|---|---|---|---|
| 3,551,184 A | * | 12/1970 | Dremann et al. | ................ 427/11 |
| 4,930,675 A | * | 6/1990 | Bedford et al. | ............. 228/114.5 |
| 5,407,697 A | * | 4/1995 | Buecher et al. | ................ 427/11 |
| 6,814,823 B1 | * | 11/2004 | White | ........................... 156/73.1 |
| 2006/0289604 A1 | | 12/2006 | Zettler et al. | |

FOREIGN PATENT DOCUMENTS

| | | |
|---|---|---|
| DE | 430016 | 6/1926 |
| DE | 155436 | 6/1982 |
| DE | 102006055994 | 5/2008 |
| EP | 0434430 | 6/1991 |
| EP | 0474455 | 3/1992 |
| EP | 1514632 | 2/2006 |

(Continued)

OTHER PUBLICATIONS

PCT/EP2009/006008 International Search Report and Written Opinion dated Nov. 25, 2009 (8 pages).

(Continued)

*Primary Examiner* — Kelly M Gambetta
(74) *Attorney, Agent, or Firm* — Michael Best & Friedrich LLP

(57) ABSTRACT

The invention relates to a coating method for coating at least one surface of a workpiece (1) by means of a coating element (2), from which material is transferred to the surface of the workpiece (1), wherein in a first method step at least the area of the surface of the workpiece (1) to be coated is heated, and in a further method step the area of the surface of a workpiece (1) to be coated is brought into contact with the coating element (2), wherein a relative motion between the surface of the workpiece (1) and the coating element (2) is applied.

7 Claims, 16 Drawing Sheets

(56) References Cited

FOREIGN PATENT DOCUMENTS

Figure 1:
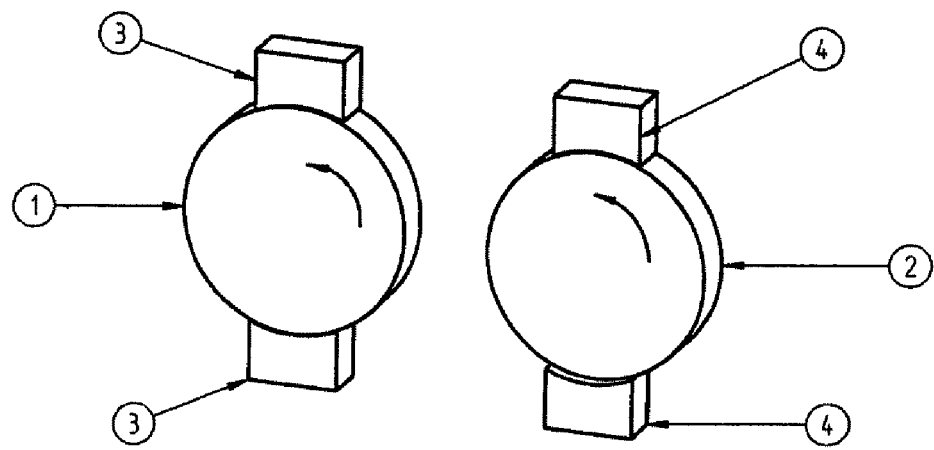

| | | |
|---|---|---|
| FR | 1365426 | 7/1964 |
| GB | 2271737 | 4/1994 |
| GB | 2271737 A * | 4/1994 |
| JP | 3207510 | 9/1991 |
| JP | 2001018062 | 1/2001 |
| WO | 2005092557 | 6/2005 |

OTHER PUBLICATIONS

Nicholas et al., "Metal Deposition by Friction Welding," Welding Journal, 1986, vol. 65, No. 8, pp. 17-27.

\* cited by examiner

SURFACE OF THE WORKPIECE AND A RELATIVE MOTION BETWEEN THE WORKPIECE AND THE COATING ELEMENT

CROSS-REFERENCE TO RELATED APPLICATIONS

This patent application is a national stage filing under 35 U.S.C. 371 of International Application No. PCT/EP2009/006008, filed 19 Aug. 2009, and published as WO/2010/022883 on 4 Mar. 2010, which claims foreign priority to German Patent Application No. 102008044763.3, filed 28 Aug. 2008, the disclosures of which are incorporated by reference herein in their entireties. Priority to each application is hereby claimed.

The invention relates to a coating method according to the preamble of claim 1.

Specifically, the invention relates to a coating method in which a surface of a workpiece is coated by means of a coating element, wherein material is transferred from the coating element onto the surface of the workpiece.

The prior art discloses build-up friction welding methods or surface friction methods in which a welding tool is brought into frictional engagement with a workpiece or a plurality of workpieces and partially superficially melts the latter by means of the frictional heat, such that the workpieces can then be welded. In these methods, which are known for example from EP 1 738 856 A1, EP 1 514 632 B1 or EP 1 514 632 A1, it proves to be disadvantageous that a high motive force and a high introduction of energy are required to heat the regions of the workpiece to be welded. These methods are unsuitable for a relatively thin application of material to relatively thin workpieces, since the coating element itself has to have appropriate mechanical properties and material properties and since a high compressive force is required. The workpiece therefore has to be sufficiently stable to absorb the compressive force. Both the material pairing and the application of pressure and the temperature control prove to be unsuitable for the coating of surfaces.

The invention is based on the object of providing a coating method of the type mentioned in the introduction which, with a simple design and simple, inexpensive feasibility, makes it possible to coat workpiece surfaces with different material pairings.

According to the invention, the object is achieved by the combination of features in claim 1; the dependent claims disclose further advantageous refinements of the invention.

According to the invention, it is therefore provided that the coating operation proceeds in at least two stages. In the first stage, or the first method step, at least that region of the surface of the workpiece to be coated is heated. This heating takes place separately from the coating element and from the subsequent coating operation. In a second stage, the actual coating operation then takes place, in which that region of the surface of the workpiece to be coated is brought into contact with the coating element, wherein a relative motion between the workpiece and the coating element is applied.

According to the invention, it is therefore possible to preheat the surface of the workpiece to be coated separately from the coating operation and the coating element. This preheating can take place in different ways, for example by frictional heating, by means of induction heating, by means of beam heating (laser beams, electron beams) or, for example, by a heating flame, an arc or a plasma beam. Furthermore, it is possible according to the invention to carry out the heating by thermal radiation or by hot gas. Resistance heating or heating by means of heating elements may also be particularly expedient according to the invention.

Furthermore, it is possible according to the invention to heat the workpiece by friction both from rotary relative motion and from linear relative motion. Heating by means of ultrasound may also be particularly expedient within the scope of the invention.

In addition, it may be advantageous according to the invention to also heat the coating material in the same way. This can also take place by heating the coating material using the heat content of the preheated workpiece during the compression operation.

The coating method according to the invention therefore makes it possible to heat the workpiece in a suitable manner, it being possible in particular to take into account the workpiece geometry, the workpiece volume, the workpiece material and further parameters. According to the invention, it is therefore possible to heat the workpiece in an optimum manner separately from the coating element and the geometry or material composition thereof.

One particularly expedient refinement of the invention provides for a friction element to be used to heat the workpiece to be coated. A suitable compressive force is preferably applied both during the heating and during the coating.

According to the invention, provision is therefore made for the surface of the workpiece to be preheated suitably before it is brought into contact with the coating element. In the same way, it may be expedient to also heat the surface of the coating element itself before it is brought into contact with the surface of the workpiece.

It is particularly expedient if the heating is carried out in each case to the plastification temperature of the respective material of the workpiece and/or of the coating element. The separate preheating makes it possible to provide different preheating temperatures for different materials.

By means of the coating method according to the invention, a friction welding process or a friction surfacing process takes place on the surface of the workpiece, such that the latter can be coated reliably and with a desired thickness. Owing to the duration and the application of force when the surface of the workpiece is brought into contact with the coating element, it is therefore possible according to the invention to specifically control or regulate the thickness of the coating layer. This too is a considerable advantage compared to the known methods, since the energy required for heating (plastification) is not introduced by interaction between the workpiece and the coating element itself.

Therefore, it is preferable for the surface both of the workpiece and of the coating element to be heated in each case by means of a friction element which can be formed with a suitable geometry and which can also be adapted optimally in terms of its material properties. By way of example, it is necessary to take into account here that the friction element itself does not react with the surface of the workpiece or of the coating element or, on the other hand, a certain amount of material may also already be introduced by the friction element, for example in order to improve the ability of the coating applied by the coating element to adhere and/or in order to form intermediate layers.

In a preferred development of the invention, it is also possible to add an additive, for example powder mixtures or the like, at least when the heated surfaces of the workpiece and of the coating element are brought into contact with one another. According to the invention, it may also be expedient for additional materials to be embedded into the surface of the workpiece. This embedding of additional materials may also take place by adding these additional materials to the coating material. By way of example, according to the invention additional materials of this type may be hard materials which are introduced into the still warm and soft applied layer, for example by scattering, shaking, blowing or the like, and which are then fixed by pressing in or rolling in.

According to the invention, it is therefore possible to produce surface coatings with a wide variety of material pairings and to optimally adapt the thicknesses of the surface coatings to the respective requirements.

In the text which follows, the invention is described with reference to exemplary embodiments in conjunction with the drawing.

Figure 2:
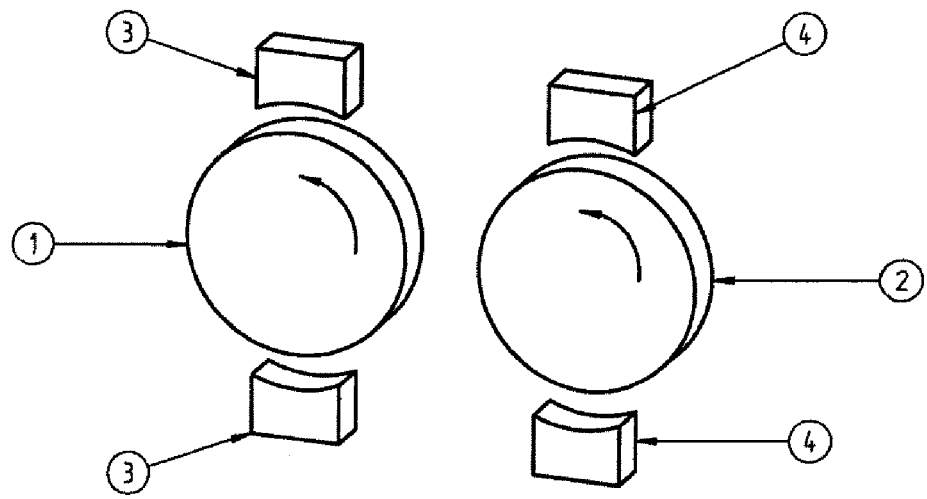
Figure 3:
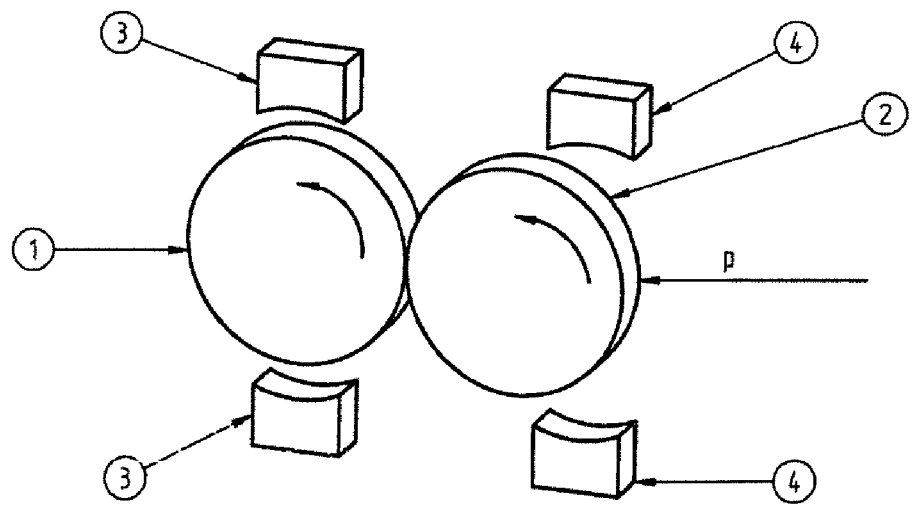
Figure 4:
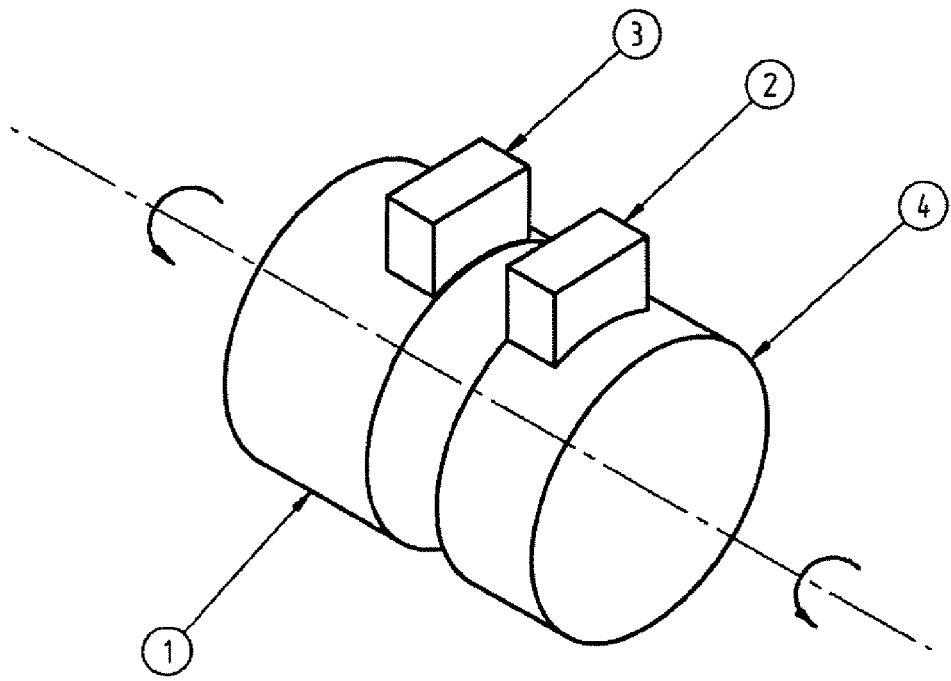
Figure 5:
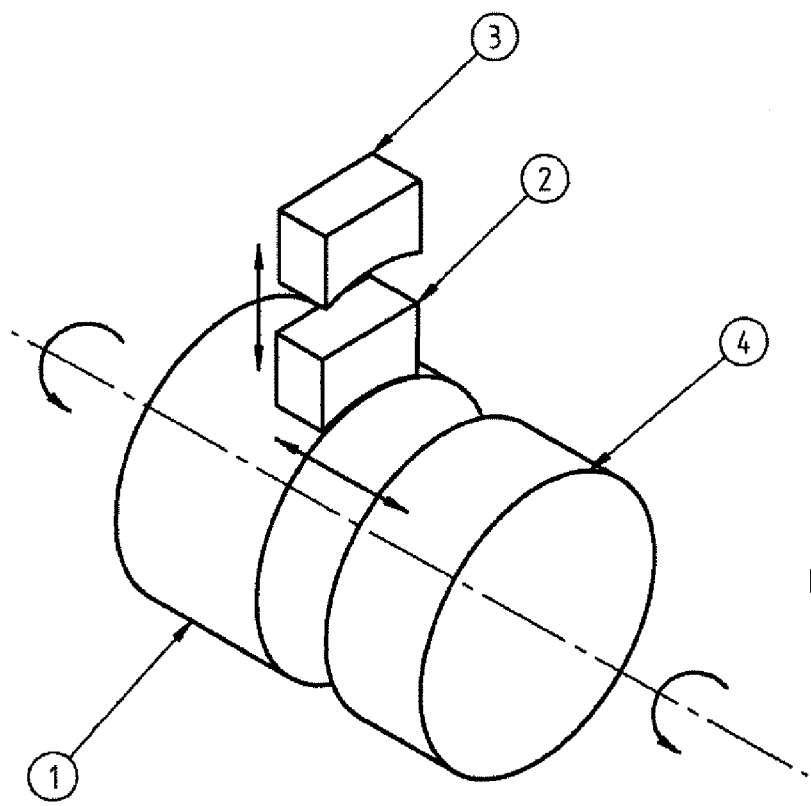
Figure 6:
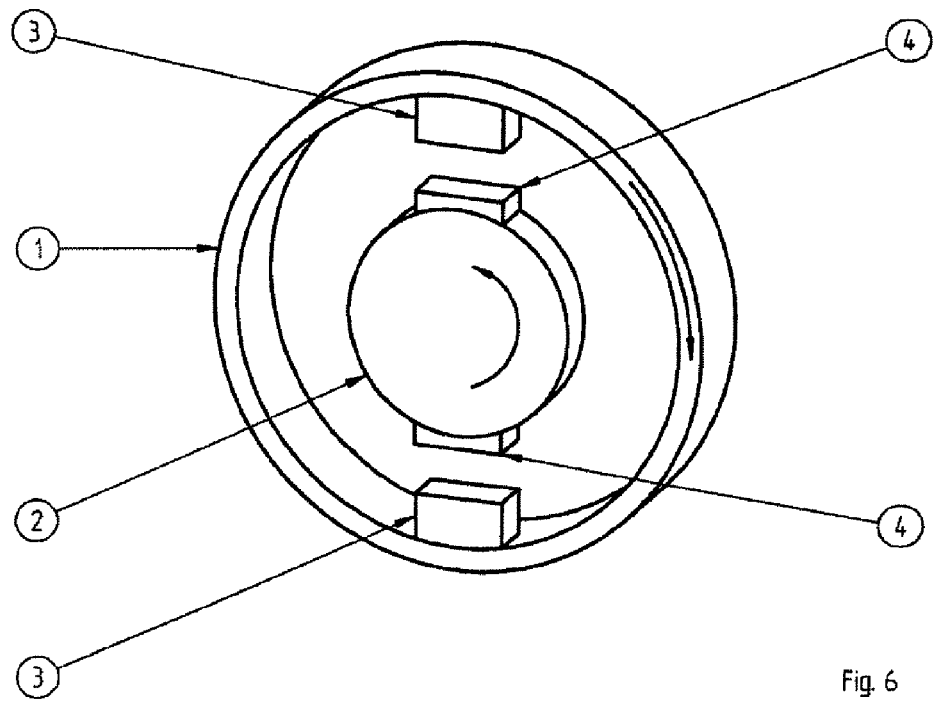
Figure 7:
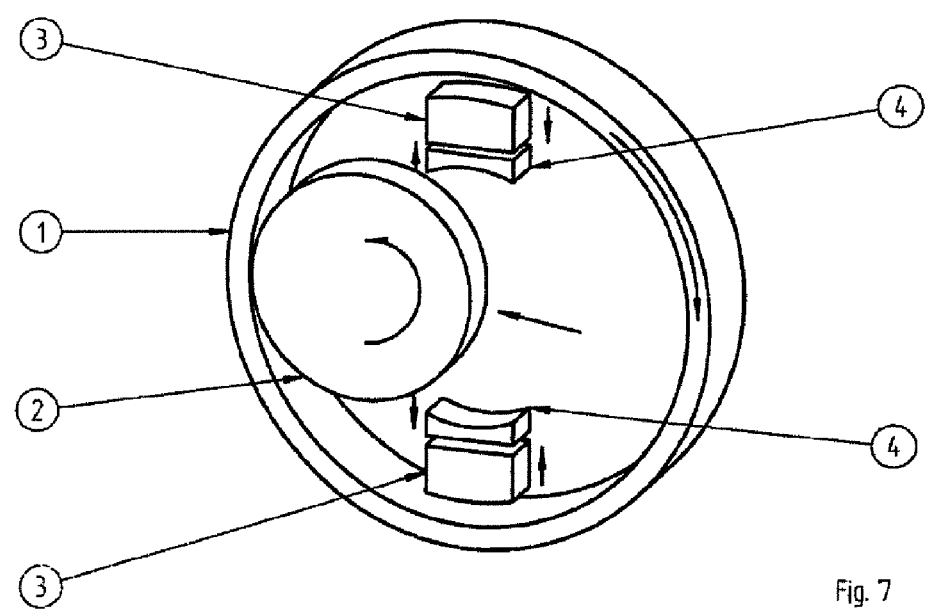
Figure 8:
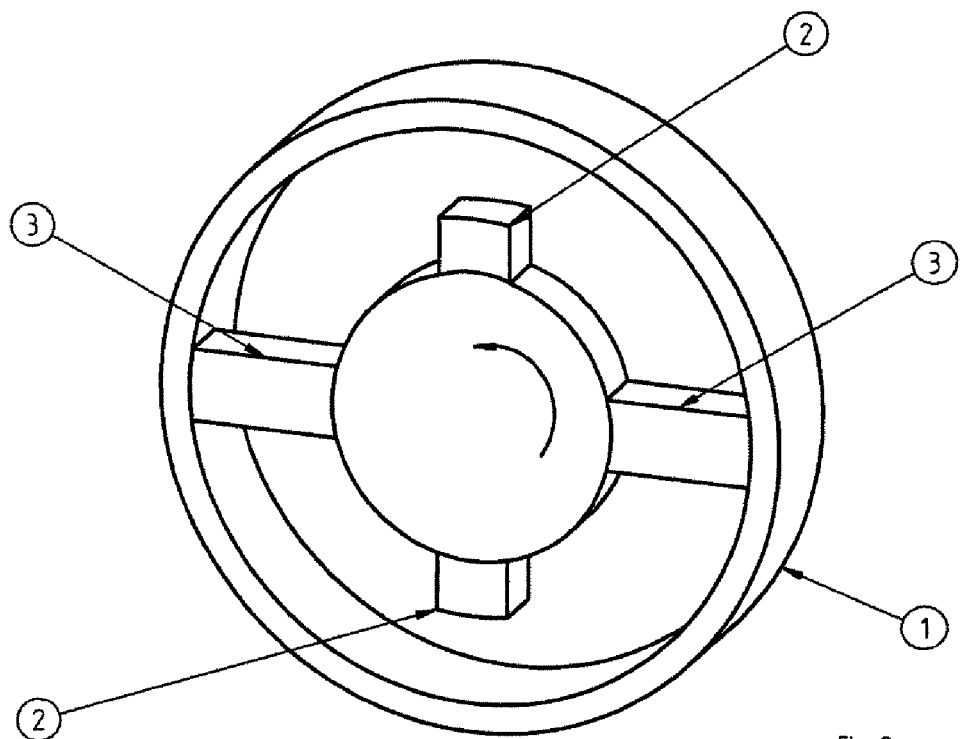
Figure 9:
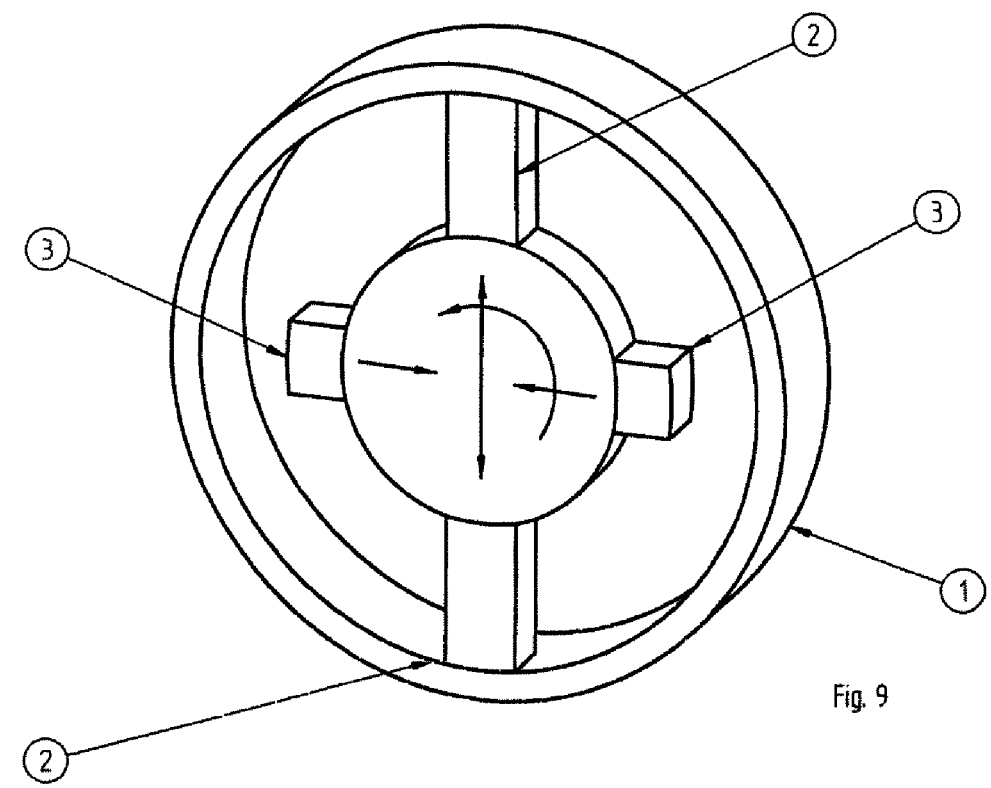
Figure 10:
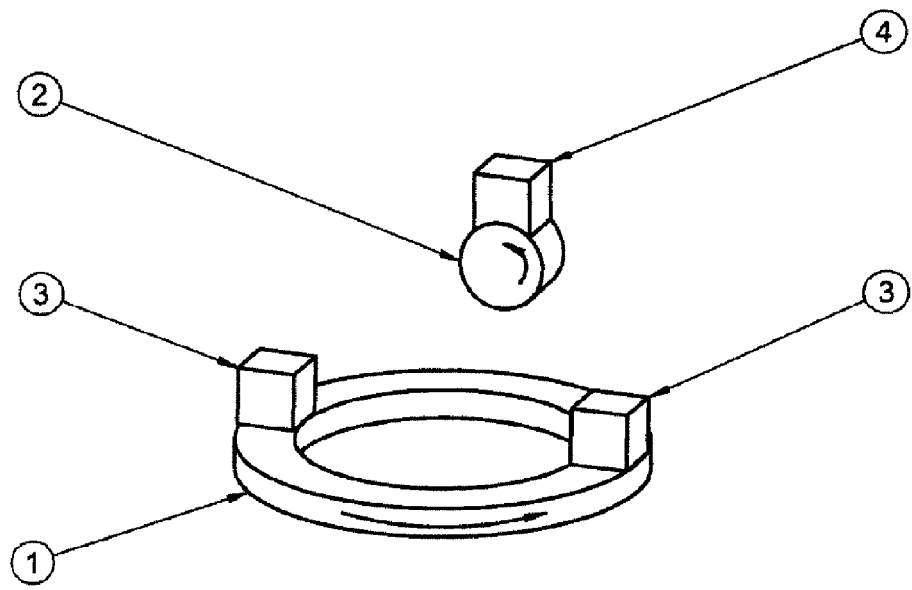
Figure 11:
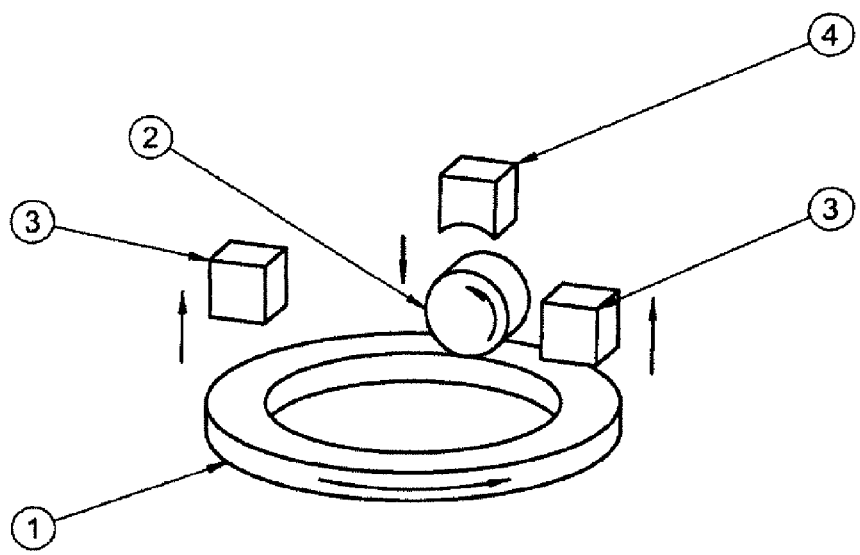
Figure 12:
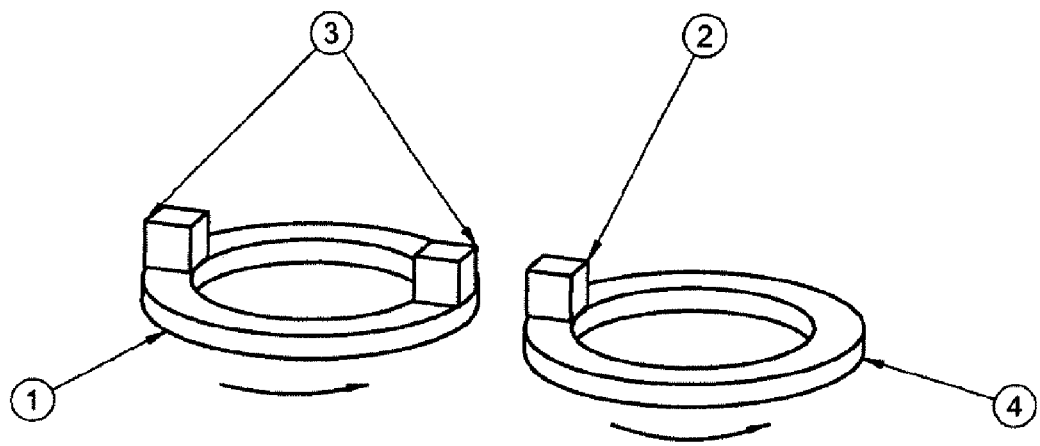
Figure 13:
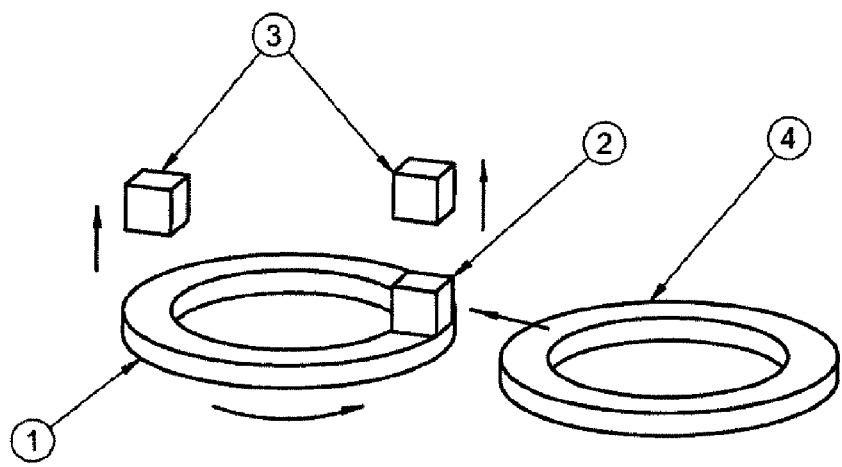
Figure 14:
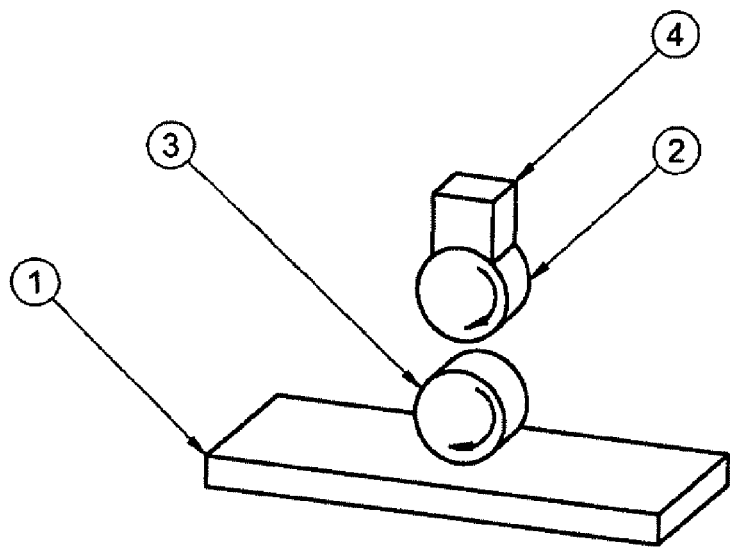
Figure 15:
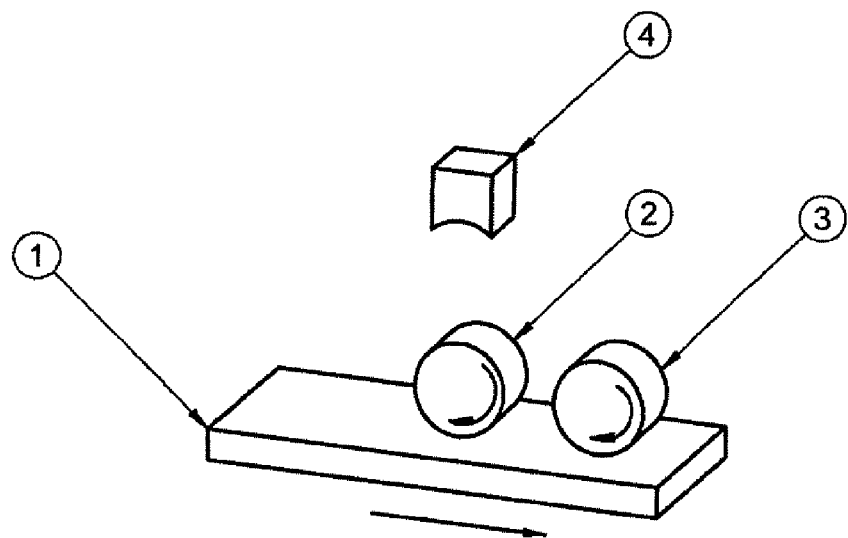
Figure 16:
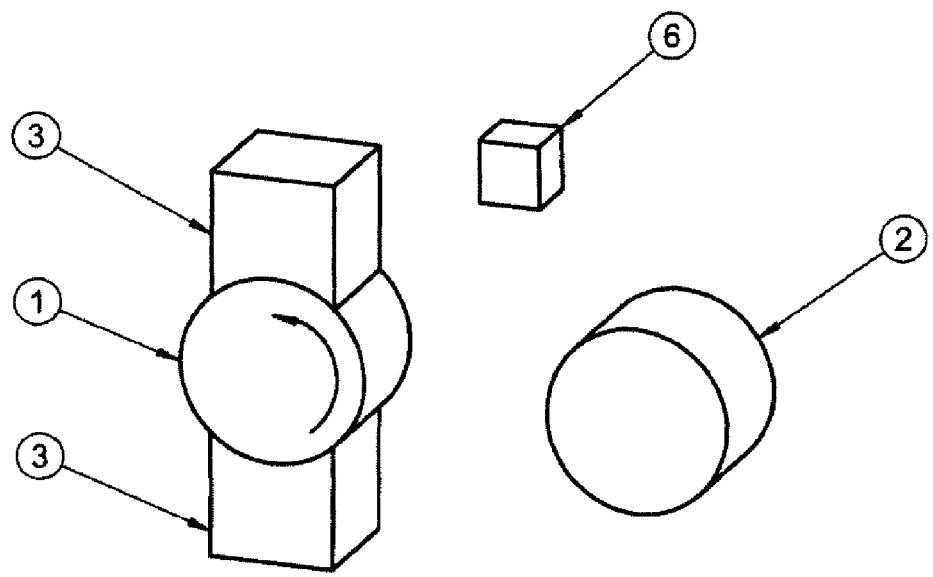
Figure 17:
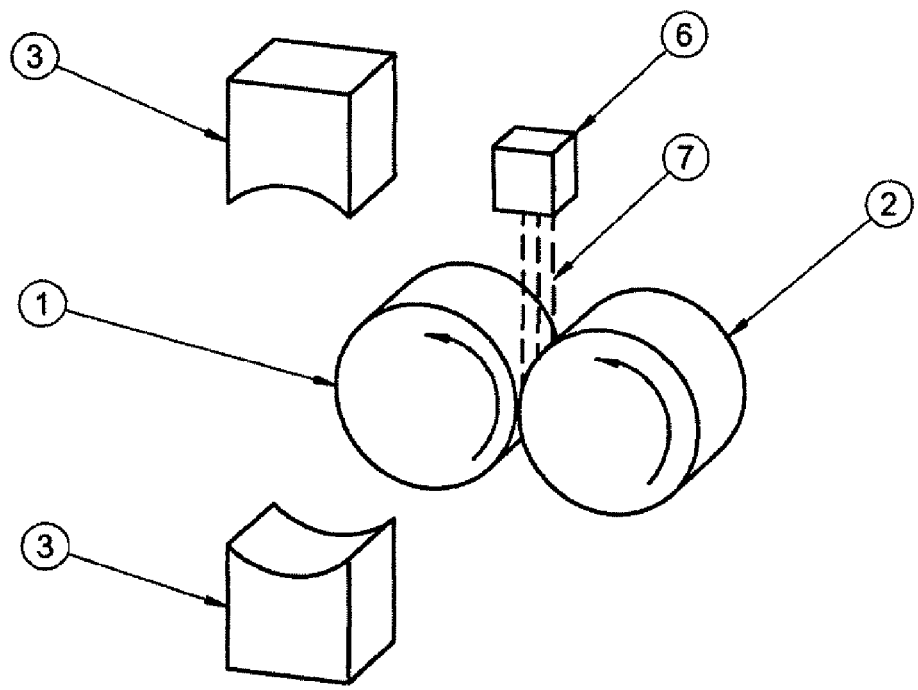
Figure 18:
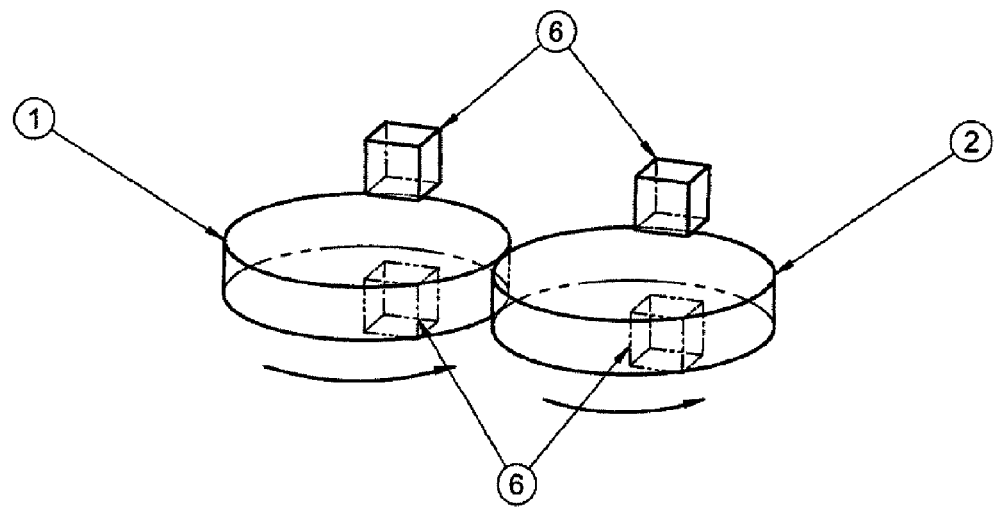
Figure 19:
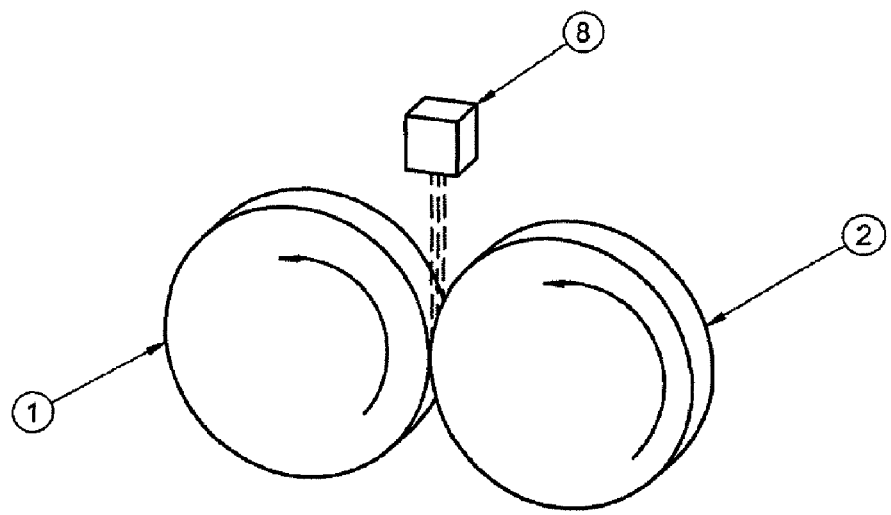
Figure 20:
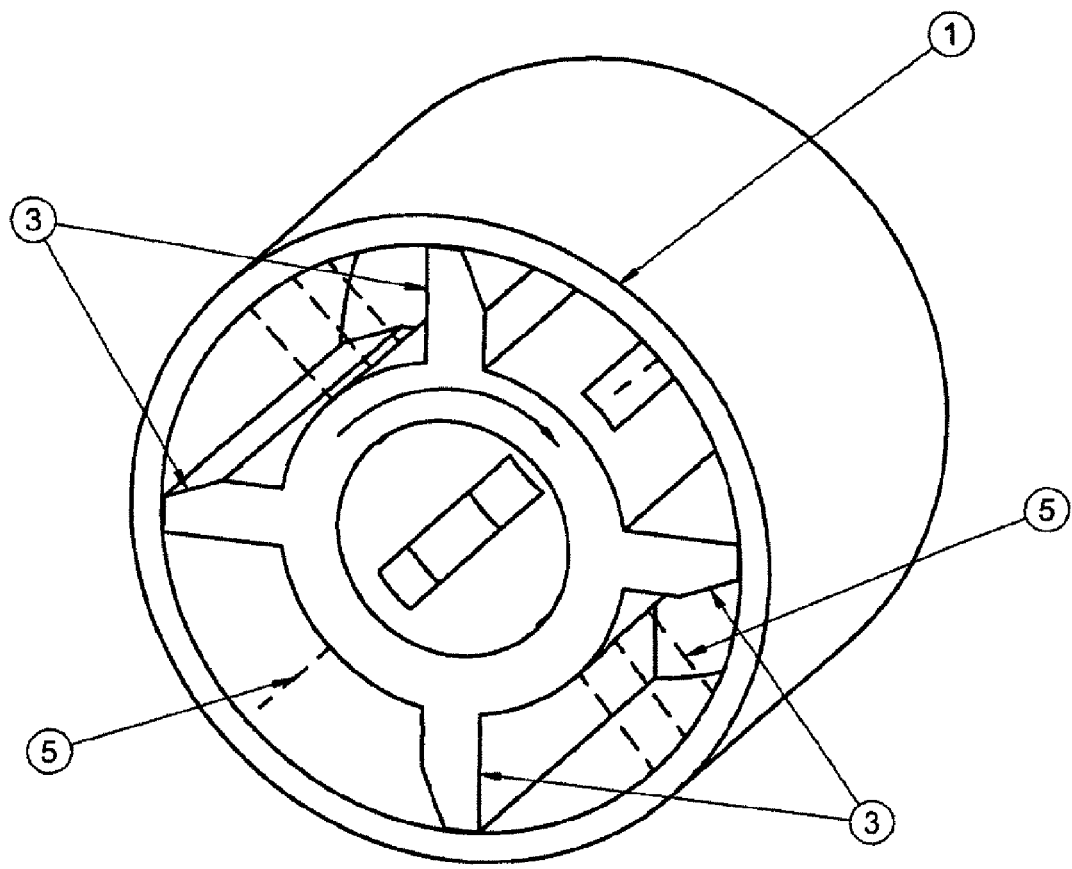
Figure 21:
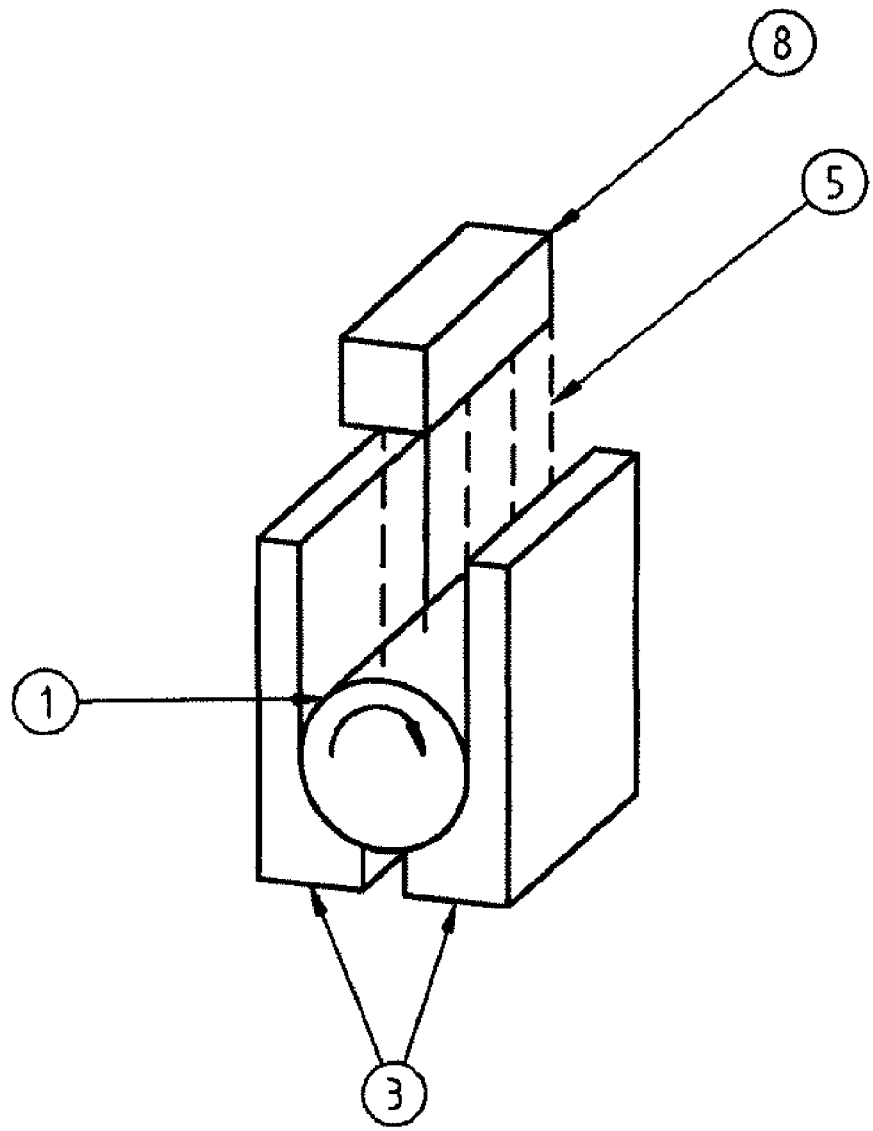
Figure 22:
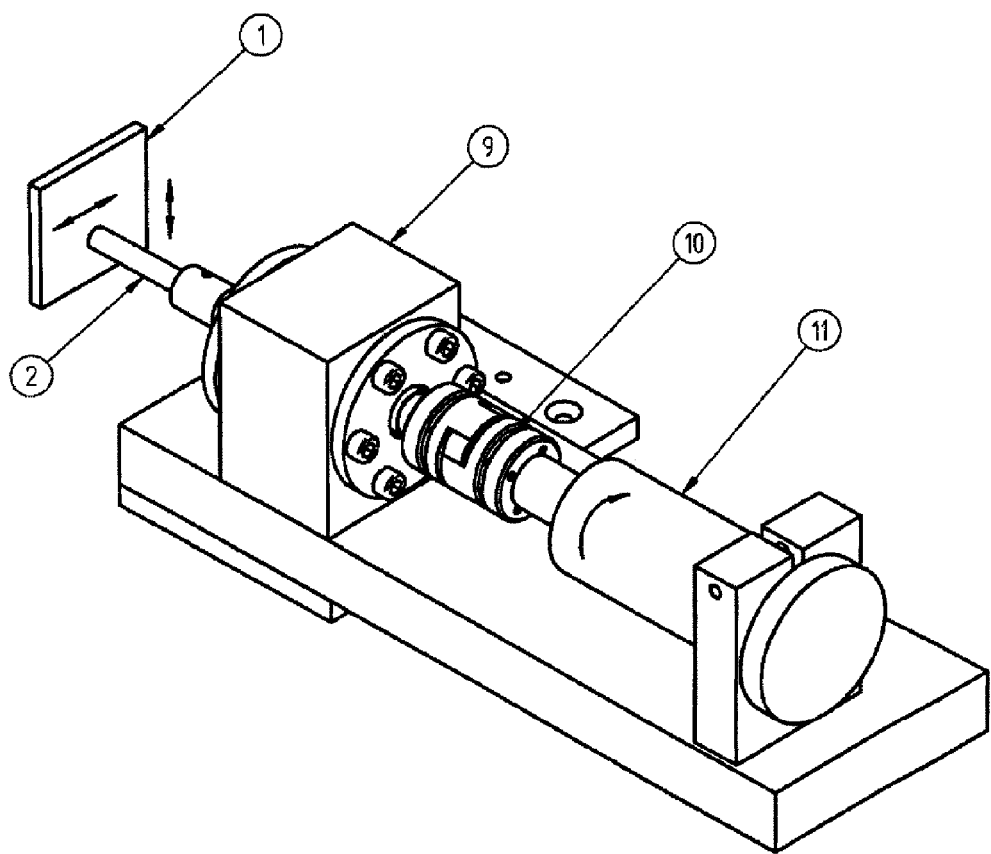
Figure 23:
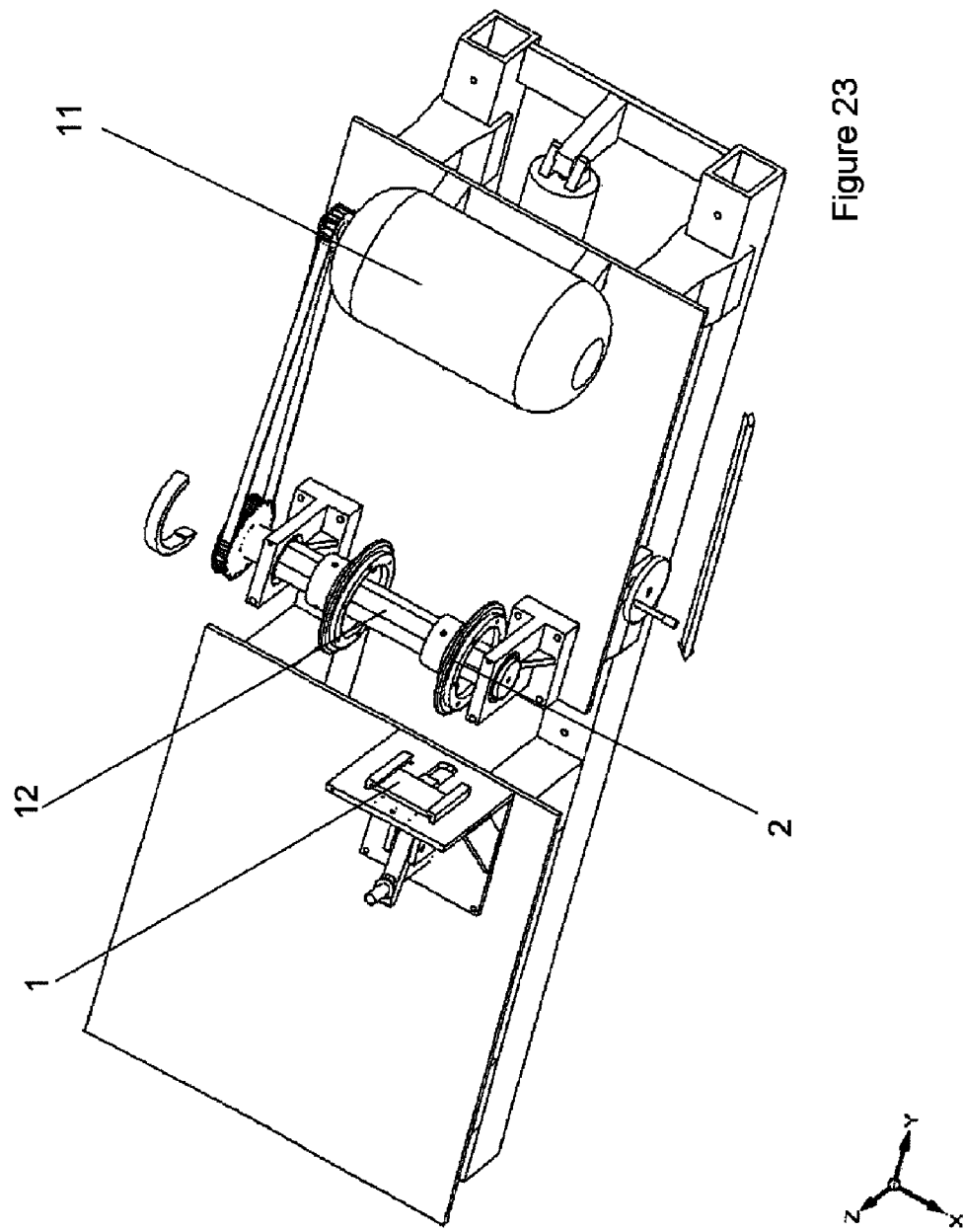
Figure 24:
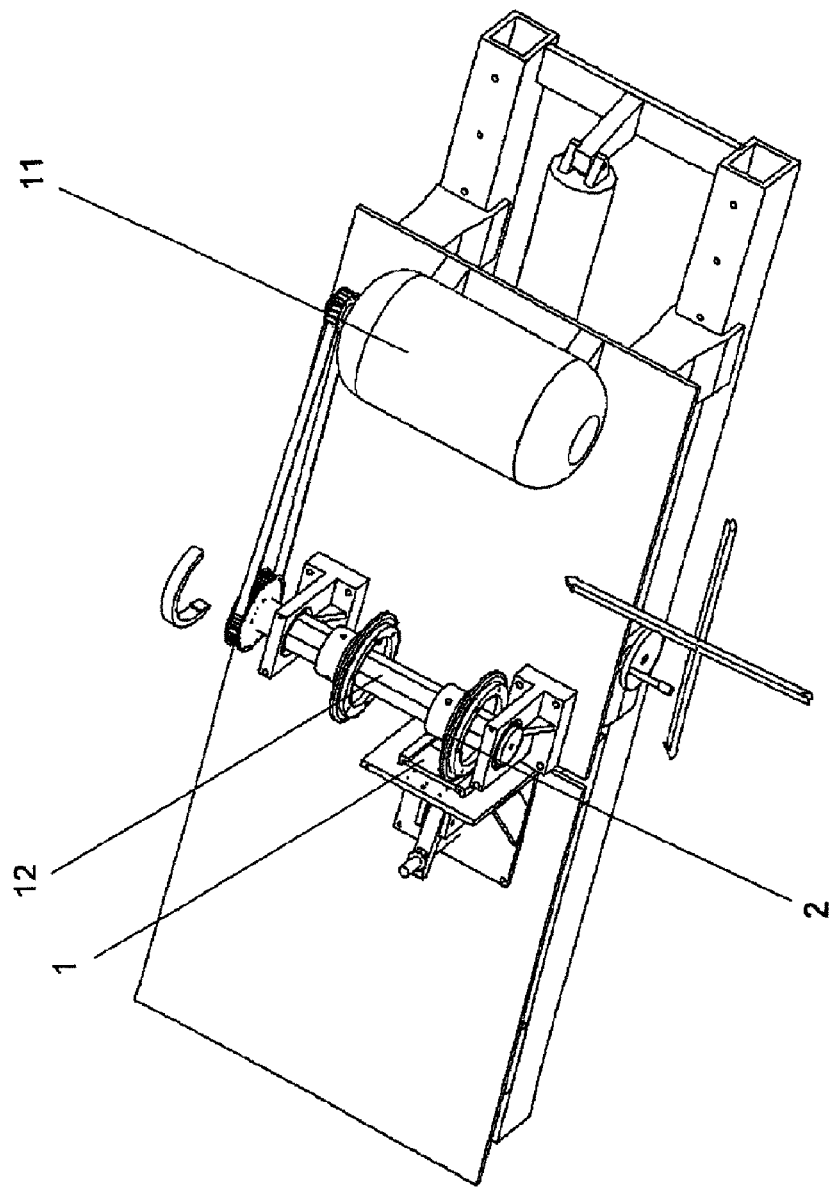
Figure 25:
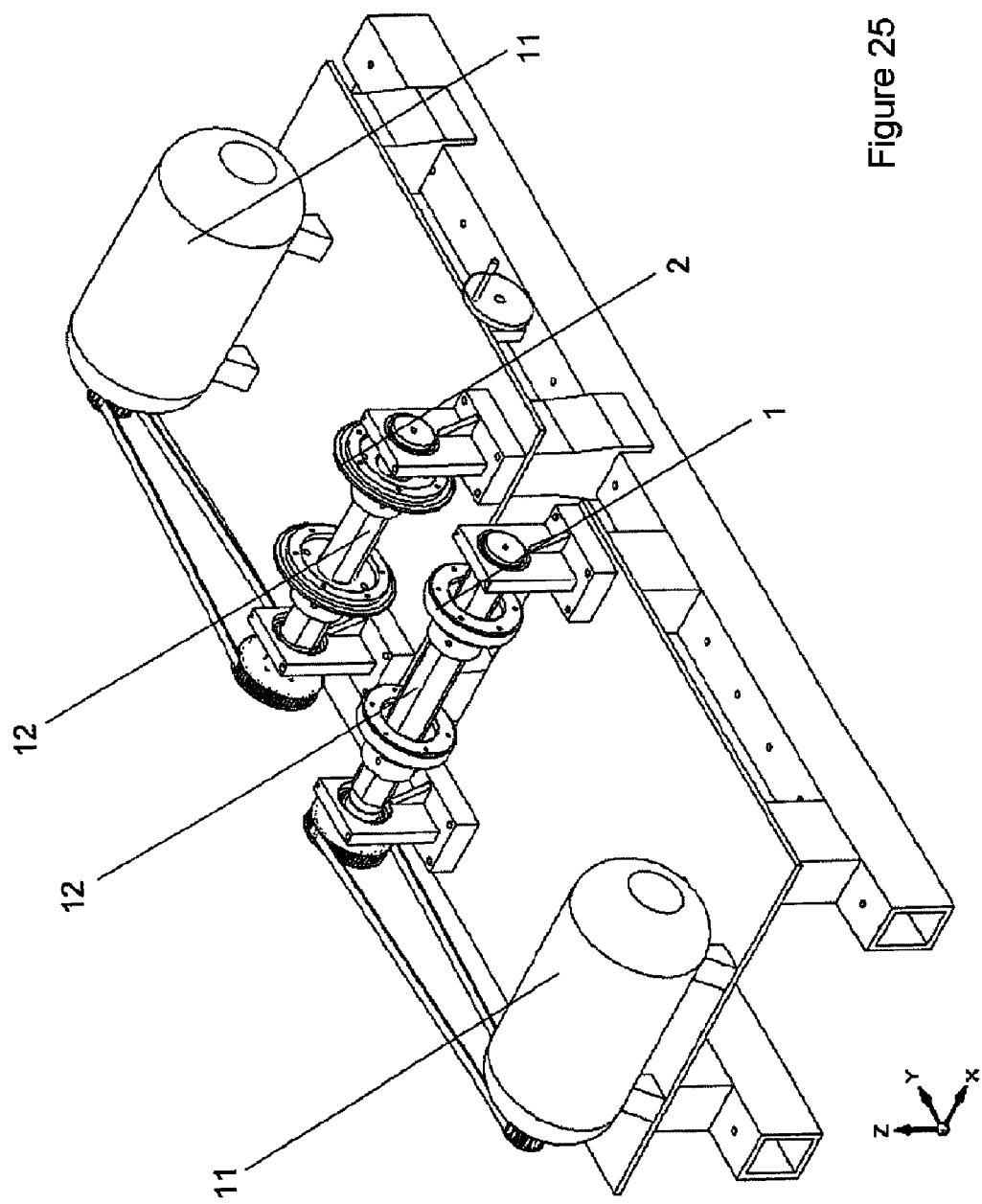
Figure 26:
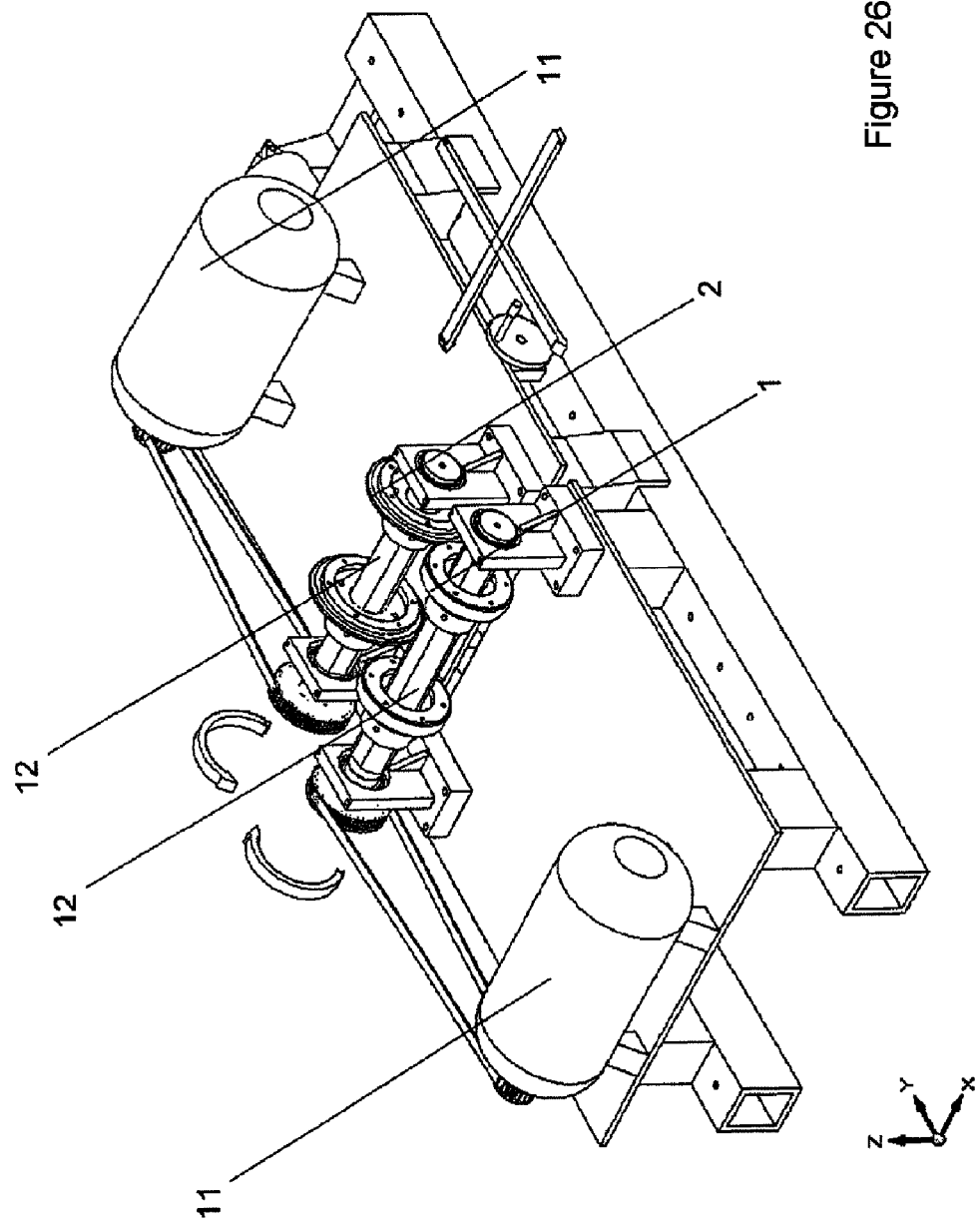

FIGS. 1-3 schematically show the external coating of a shaft of a tube,

FIGS. 4, 5 show a modified exemplary embodiment for the external coating of a shaft or of a tube, FIGS. 6, 7 show an exemplary embodiment for the internal coating of a tube, FIGS. 8, 9 show an exemplary embodiment for the internal coating of a bore hole or of a tube, FIGS. 10, 11 show an exemplary embodiment for coating a disk-shaped workpiece, FIGS. 12, 13 show a further exemplary embodiment for coating a disk-shaped workpiece, FIGS. 14, 15 show an exemplary embodiment for coating a sheet of metal or a plate, FIGS. 16, 17 show exemplary embodiments for heating by means of separate heat sources, FIG. 18 shows a further exemplary embodiment for coating a disk in the case of induction heating, FIGS. 19-21 show exemplary embodiments for coating with the application of additional material, FIG. 22 shows a perspective view of a first device for coating a plate, FIGS. 23 and 24 show a perspective view of a further device for coating a plate, and FIGS. 25 and 26 show a perspective view of a device for coating a cylindrical component.

In the exemplary embodiments, identical parts are provided with identical reference numerals.

FIGS. 1-3 each show a workpiece 1 in the form of a shaft or of a tube and a likewise cylindrical coating element 2, from the surfaces of which material is to be transferred onto the surface of the workpiece 1.

FIG. 1 shows a heating phase in which both the workpiece 1 and the coating element 2 are made to rotate. The workpiece 1 is heated by friction by means of jaw-like friction elements 3 which are pressed against the surface of the workpiece 1. The same applies to the coating element 2, which is heated by means of similar friction elements 4.

FIG. 2 shows a state in which the friction elements 3 and 4 are retracted. FIG. 3 shows the third stage of the method according to the invention, in which a compressive force P presses the coating element 2 against the workpiece 1 in order to thereby carry out a surface coating.

Owing to the heating of the workpiece 1 shown in FIG. 1, the surface of the latter is heated and cleaned/activated. As soon as the two surfaces of the workpiece 1 and of the coating element 2 have reached the respective temperature, a reactive soft surface is obtained, and this surface leads to friction welding owing to the counterrotation and owing to the application of the compressive force P. In this case, the surface of the coating element 2 in particular is heated to a greater extent and softer than the surface of the workpiece 1. It is therefore possible for an expanding coating of the material of the coating element 2 to be built up on the surface of the workpiece 1. This is controlled by the compressive force P. Once a sufficient coating has been applied, the workpiece 1 and the coating element 2 are separated from one another.

The coating method according to the invention has the following advantages among others:

pore-free and cavity-free coatings;
very many combinations of material similar to friction welding are possible;
short coating times;
the coating thickness can be set virtually as desired;
high adhesive strength of the coating material on the base material;
it is possible to produce smooth surfaces;
low costs;
it is also possible to coat and apply materials with very different heat conduction and heat capacity owing to the targeted heat control of the workpiece and the build-up material;
in addition to the friction welding process, a joining process which is similar to brazing and is accentuated further by the compressive force is also possible;
large number of possible material combinations.

By way of example, the method according to the invention can be used with preference for the coating of shafts and bearing journals with bearing materials, wear and corrosion layers and/or electrically or thermally conductive materials.

FIGS. 4 and 5 show the external coating of a shaft or tube. In this case, a workpiece 1 is made to rotate about an axis of rotation and is heated at a partial circumferential region by means of a friction element 3. A cylindrical friction element 4 made to rotate heats a coating element 2 (FIG. 4). After sufficient heating, the coating element 2 is brought into contact with the workpiece 1, while the friction elements 3 and 4 are not in operation (FIG. 5).

FIGS. 6 and 7 show a variant according to the invention for the internal coating of a tube of a tubular workpiece 1 by means of a cylindrical coating element 2. As indicated by the arrows, these elements are made to counterrotate. In the heating phase (FIG. 6), the workpiece 1 and the coating element 2 are heated by means of the friction elements 3 or the friction elements 4. Once heating has been carried out, the coating element 2 is pressed against the internal surface of the workpiece 1 in order to carry out the coating operation.

By way of example, this method variant can be used for the coating of cylinder barrels in engines or for the protection of tubes against corrosion or wear. It is also possible to thereby coat bearing bushes with bearing materials.

FIGS. 8 and 9 show a further variant for coating the internal wall of a bore hole or of a tube of a workpiece 1 by means of jaw-shaped coating elements 2. Here (see FIG. 8), the surface of the workpiece 1 is firstly heated by means of the friction elements 3, while the coating elements 2 are not engaged. As shown in FIG. 9, after the heating phase the coating elements 2 are pressed against the internal surface of the workpiece 1, while the friction elements 3 are disengaged. In this case, the coating elements 2 are heated, by way of example, by a centric region or by external heat sources.

FIGS. 10 and 11 show an example for coating a disk-shaped workpiece. As can be seen from the plan view in FIG. 10, this workpiece is made to rotate and is heated at its surface by means of the friction elements 3. A cylindrical or pin-shaped coating element 2 is heated by means of a friction element 4 formed like a friction block. After the heating phase, the coating element 2, which is in counterrotation to the workpiece 1, is brought into contact with the latter and pressed against it, while the friction elements 3 and 4 are not in contact (see FIG. 11).

This embodiment variant can be used, for example, for coating brake disks.

FIGS. 12 and 13 show a modified refinement of a method for coating disks. In this case, too, the disk-shaped workpiece 1 to be coated is heated by means of friction elements 3 (FIG. 12). In this case, the coating element 2 is in the form of a block and is heated by a rotating disk as the friction element 4. After the surfaces have been heated, the coating element 2 is brought into contact with the surface of the workpiece 1, while the friction elements 3 and 4 are disengaged (FIG. 13).

FIGS. 14 and 15 show a variant according to the invention for coating sheets of metal and plates. In this case, a plate-shaped workpiece 1 is heated by means of a cylindrical rotating friction element 3, for example along a surface strip, as shown in the plan view of FIG. 14. At the same time, a cylindrical coating element 2 is heated by means of a jaw-like friction element 4.

After the coating element 2 has been heated, it is brought into contact with the surface of the workpiece 1 and moved along it, for example, while the friction element 3 is still in engagement with the surface of the workpiece 1 and, forward from the coating element 2, heats a surface strip of the workpiece, as shown in FIG. 15. The arrow pointing to the right in this figure indicates the direction of advance. By way of example, in this case the coating element may additionally be heated during the advance furthermore by means of the friction element 4. It is thereby possible to also apply layers over a large surface area. An exemplary application is the coating of sheets of metal and supports, the application of reinforcing ribs to sheets of metal by producing strip-shaped patterns or, for example, the compensation of wear on rails.

FIGS. 16 and 17 show refinement variants in which, by way of example, the coating element 2 is heated by means of one or a plurality of additional heat source elements 6. These can emit a laser beam or electron beam.

According to FIG. 16, the surface of the workpiece 1 is firstly heated by means of jaw-like friction elements 3, while the heat source element 6 is still switched off and the wavelike coating element 2 is stationary.

After the surface of the workpiece 1 has been heated, the friction elements 3 are retracted. The coating element 2 is made to rotate and is heated by means of a heating beam 7 from the heat source element 6. In the process, the coating element 2 is pressed against the workpiece 1. It is similarly possible for a plasma beam or an arc to be emitted from the heat source element 6. Direct heating by means of a flame is also possible.

In the variant described, it is possible to bring even very hard and heat-resistant materials, for example ceramic materials, on the surface to softening point and to apply these in the subsequent friction welding process to the workpiece 1. By way of example, ceramic layers can thereby be applied to metallic base bodies; it is likewise possible to provide cylinder barrels, for example, with layers of hard metal or to equip bearing journals with ceramic wear-resistant layers.

FIG. 18 shows a variant of the method according to the invention for coating disks, wherein a disk-shaped workpiece 1 is made to rotate and is heated by means of heat source elements 6 in the form of induction coils. Parallel to this, a disk-shaped coating element 2 is likewise made to rotate and is likewise heated by means of induction coils. The material is applied by the radial impact of the two heated disks. It is therefore possible to apply a coating layer on the circumferential edge.

FIGS. 19-21 show variants according to the invention, in which coating is carried out by applying an additional material 5, for example in powder form, from a reservoir 8. By way of example, it is therefore possible for pulverulent hard materials or further additives to be scattered in or blown in with air or protective gas (see FIG. 19), while the workpiece 1 is in contact with the coating element 2. By way of example, it is thereby possible to produce layers of composite materials, for example for brake disks or friction disks.

FIG. 20 shows a variant for coating internal walls of tubes by adding powder as the additive 5, for example for coating bearing shells, cylinder barrels in engines, internal coatings of tubes or hydraulic or pump cylinders. In this case, too, it is possible to supply additional material 5 in the form of powder consisting of pure metals, metal mixtures, plastics or ceramics.

FIG. 21 shows a similar refinement for the addition of additives 5 during the heating of a workpiece 1 by means of brake-jaw-like friction elements 3.

FIG. 22 shows a plate-shaped workpiece 1 which can be moved in two dimensions (as shown by the double-headed arrows). Furthermore, a cylindrical or rod-shaped coating element 2 is shown; this is fastened to a shaft held in a bearing. The device also comprises a coupling 10 and a drive motor 11.

It is therefore possible to move the workpiece 1 on the end-side surface of the coating element 2 such that planar coating is possible.

FIGS. 23 and 24 show a modified device for coating a plate-shaped workpiece 1, wherein the coating element 2 has an annular form and is mounted on a rotatable shaft 12 which can be driven by means of a motor 11. Adjustment in the direction of the arrows shown in FIGS. 23 and 24 makes it possible to apply a relative motion between the coating element 2 and the workpiece 1 after appropriate heating (neither FIGS. 23 and 24 nor FIG. 22 show the heating device).

It can be seen from FIG. 23 that the device affords adequate free space for access both to the workpiece 1 and to the coating element 2 in the heating or initial state, and therefore the heating can proceed in a suitable manner. FIG. 24 then shows the actual machining operation.

FIGS. 25 and 26 similarly show initially the original state or heating state (FIG. 25) and the machining state (FIG. 26). In the device shown in FIGS. 25 and 26, use is made both of a cylindrical workpiece 1, which is mounted on a shaft 12, and of a disk-shaped or cylindrical coating element 2, which is likewise mounted on a further shaft 12. As is apparent from the arrows depicted, provision is made for both an axial motion along the axes of the shafts 12 during the coating operation and an infeed motion arranged perpendicularly thereto.

The invention claimed is:

1. A coating method for coating at least a surface of a workpiece using a coating element from which material is transferred onto the surface of the workpiece, the method comprising:
   heating in a first method step at least a portion of the surface of the workpiece to be coated;
   moving in a further method step the portion of the surface of a workpiece to be coated into contact with the coating element, wherein a relative movement is applied between the surface of the workpiece and the coating element;
   heating at least the surface of the coating element before contacting with the surface of the workpiece to be coated;
   wherein the heating of the surface of the workpiece to be coated and the surface of the coating element is respectively carried out at least to the respective plastification; and wherein a compressive force is applied upon contacting of the workpiece with the coating element.

2. The method as claimed in claim 1, wherein a friction welding process takes place between the surface of the workpiece to be coated and a surface of the coating element.

3. The method as claimed in claim 1, wherein a friction surfacing process takes place between the surface of the workpiece to be coated and a surface of the coating element.

4. The method as claimed in claim 1, wherein heating at least the portion of the surface of the workpiece to be coated includes heating the portion with a friction element.

5. The method as claimed in claim 1, wherein heating the surface of the coating element includes heating the surface of the coating element with a friction element.

6. The method as claimed in claim 1, further comprising adding at least one additive at least when the heated portion of the surface of the workpiece and the coating element are brought into contact with one another.

7. The method as claimed in claim 1, wherein heating at least the portion of the surface of the workpiece includes heating at least the portion with at least one external heat source.

\* \* \* \* \*